United States Patent [19]

Perry

[11] Patent Number: 4,596,589
[45] Date of Patent: Jun. 24, 1986

[54] METHOD FOR PRODUCING A SINGLE MODE FIBER PREFORM

[76] Inventor: Gregory A. Perry, 2693 Wood Hollow Dr., Doraville, Ga. 30360

[21] Appl. No.: 578,484

[22] Filed: Feb. 9, 1984

[51] Int. Cl.$^4$ .................... C03B 37/018; C03B 37/012
[52] U.S. Cl. ................................. 65/3.12; 65/3.11
[58] Field of Search ................... 65/3.11, 13, 3.12, 3.2

[56] References Cited

U.S. PATENT DOCUMENTS

| | | | |
|---|---|---|---|
| 3,711,262 | 1/1973 | Keck et al. | 65/3.11 |
| 3,826,560 | 7/1974 | Schultz | 65/3.12 X |
| 3,901,674 | 8/1975 | Strack et al. | 65/3.11 |
| 3,933,454 | 1/1976 | DeLuca | 65/3.12 |
| 4,062,665 | 12/1977 | Izawa et al. | 65/13 X |
| 4,089,586 | 5/1978 | French et al. | 350/96.30 |
| 4,154,591 | 5/1979 | French et al. | 65/3.11 X |

FOREIGN PATENT DOCUMENTS

| | | | |
|---|---|---|---|
| 54-131043 | 10/1979 | Japan | 65/3.11 |
| 57-92536 | 6/1982 | Japan | 65/3.11 |

*Primary Examiner*—Kenneth M. Schor
*Attorney, Agent, or Firm*—Howard A. Kenyon

[57] ABSTRACT

A method for fabricating a single mode fiber preform is described. The method consists of placing a core rod in a glass lathe, sliding a barrier tube over the core rod, partially attaching the barrier tube to the core rod, rotating and heating the barrier tube, and traversing the heat source until the barrier tube collapses onto the core rod. A second tube of high purity quartz called a primary jacket tube is then slipped over the combination fabricated from the core rod and barrier tube, rotating and heating the primary jacket tube, and traversing the heat source until the primary jacket tube collapses onto the barrier tube. A third tube of high purity quartz called a secondary jacket tube is then slipped over the combination fabricated from the core, barrier tube and primary jacket tube, partially attaching the secondary jacket tube to the primary jacket tube, rotating and heating the secondary jacket tube, and traversing the heat source until the secondary jacket tube collapses over the primary jacket tube to form a single mode fiber preform.

16 Claims, 5 Drawing Figures

A-A

B-B

METHOD FOR PRODUCING A SINGLE MODE FIBER PREFORM

FIELD OF THE INVENTION

This invention is a method of fabricating a single mode fiber preform.

BACKGROUND OF THE INVENTION

Fibers that are used for optical communication are waveguides made of transparent dielectrics whose function is to guide visible and infrared light over long distances. An optical fiber consists of an inner cylinder made of glass, called the core, surrounded by a cylindrical shell of glass or plastic of lower refractive index, called the cladding. The cladding may be made from several layers called the barrier tube and jackets. When the cladding is secured to the core rod and the cladding is a specified diameter, the combination is called a fiber optic preform.

There are three (3) significant fabrication processes in use today to manufacture fiber optic preforms which in-turn are used to manufacture optical fibers. One process is commonly known as the lateral soot deposition technique as described in U.S. Pat. Nos. 3,711,262 and 3,876,560. In the lateral soot deposition technique, glass particulate matter and dopant halides are formed in a hydrolysis burner and deposited on a starting member such as a glass rod. Additional layers of glass including a cladding layer are deposited on the rod and the combination is consolidated onto a transparent rod by heating in an inert environment. Subsequent to the consolidation, the starting member may be withdrawn, leaving a hollow cylinder of glass which may be drawn into a fiber. This process, developed by Corning Glass Works, requires many passes (up to 200) by the hot soot stream and is therefore costly and time consuming. In addition, after the soot is deposited, the preform must be sintered in a controlled inert atmosphere such as helium. To provide this special equipment for heating in an inert atmosphere is also costly. Unlike the present invention, the soot deposition technique provides a preform with a hole through the center of the preform when the bait rod is removed. This could cause problems in fiber drawing. Still another disadvantage of this technique is disposing of the impurities introduced into the fiber core glass by the flame combustion products during soot deposition. These impurities also include water of hydration which must be removed using a chlorine gas drying process. All of these additional requirements introduce more extensive process control that increase the production cost.

Another fabrication process is known as the modified chemical vapor deposition technique (M.C.V.D.). In this technique, glass precusor vapors are directed through a hollow glass cylinder which is heated sufficiently to start a homogeneous reaction within the glass cylinder. During this reaction. glass particulate matter is formed, deposited on the inside of the glass cylinder, and subsequently fused onto the cylinder and into a glass material by traversing the heat source. Since the starting glass is the outside layer, it may be composed of a material suitable for cladding. This technique, developed at Bell Laboratories, also has some problems related to inefficient deposition rates and starting tube needs which are in turn related to manufacturing economics.

Still another technique for the fabrication of fibers is called a vapor axial deposition process, or more commonly (V.A.D.). This process, described in U.S. Pat. No. 4,062,665, involves simultaneous flame deposition of both core and cladding soots onto the end (axially) of a rotating fused-silica bait rod. As the porous soot preform grows it is slowly drawn through a graphite resistance furnance (carbon heater) where it is consolidated into a transparent glass preform by zone-sintering. This process has all the disadvantages and problems involved with a hydrolysis burner containing dopant halides as described above in the lateral soot deposition technique except in this case there are two (2) hydrolysis burners to control. One burner is for the cladding material and another is for the core material. The process control of the finished preform and the control of both burners must be precise. The average soot collection efficiency for the outside deposition process as described above is approximately 50%. Another problem involves the high hydroxyl impurity content in the fiber core glass introduced by the flame combination products during soot deposition.

What is needed is a method for producing a single mode fiber preform that avoids the problems associated with the prior art. While all of these above techniques can be used to produce a single mode fiber preform, they cannot produce the preform in the same volume and in the same time as in the present invention. In addition, the capital outlay of equipment of the present invention is less than the capital outlay of any one of the previously discussed methods of making fiber optic preforms. This lower capital outlay yeilds a less expensive end product. It is estimated that the present invention will fabricate single mode fibers five (5) times faster than any of the previously discussed techniques at one-half of the cost. The present invention is, therefore, a very cost effective method of fabricating single mode fiber preforms.

SUMMARY OF THE INVENTION

It is the object of the present invention to provide a novel and efficient method of fabricating a single mode optical fiber preform.

It is another object of this instant invention to provide a method of substantially reducing the time and cost to fabricate a single mode optical fiber preform.

It is yet another object of this instant invention to provide a method of efficiently attaching cladding material about a single mode fiber core.

Briefly, in accordance with this invention, there is provided a method of fabricating a single mode fiber preform by placing a core material in a glass lathe, rotating the core material, placing a hollow barrier tube on the core material whose index of refraction is lower than the core material, attaching the hollow barrier tube to the core, rotating the combination of core and barrier tube, traversing a heat source on the combination until the barrier tube is collapsed on the core. The combination may require at least one more hollow jacket of high purity quartz whereas the additional jacket may be attached to the core by repeating the same method described above. These and other objects, features and advantages of the present invention will become more readily apparent upon detailed consideration of the following description of a preferred embodiment with reference to the accompanying drawing.

While the invention will be described in connection with the preferred embodiment, it will be understood that it is not intended to limit the invention to those embodiments. On the contrary, it is intended to cover all alternatives, modifications, and equivalents that may be included within the spirit and scope of the invention as described by the appended claims.

DETAILED DESCRIPTION OF THE PREFERRED EMBODIMENT

It is to be noted that the drawings are illustrated and symbolic of the present invention and there is no intention to indicate the scale or relative proportions of the elements shown therein.

Figure 1:
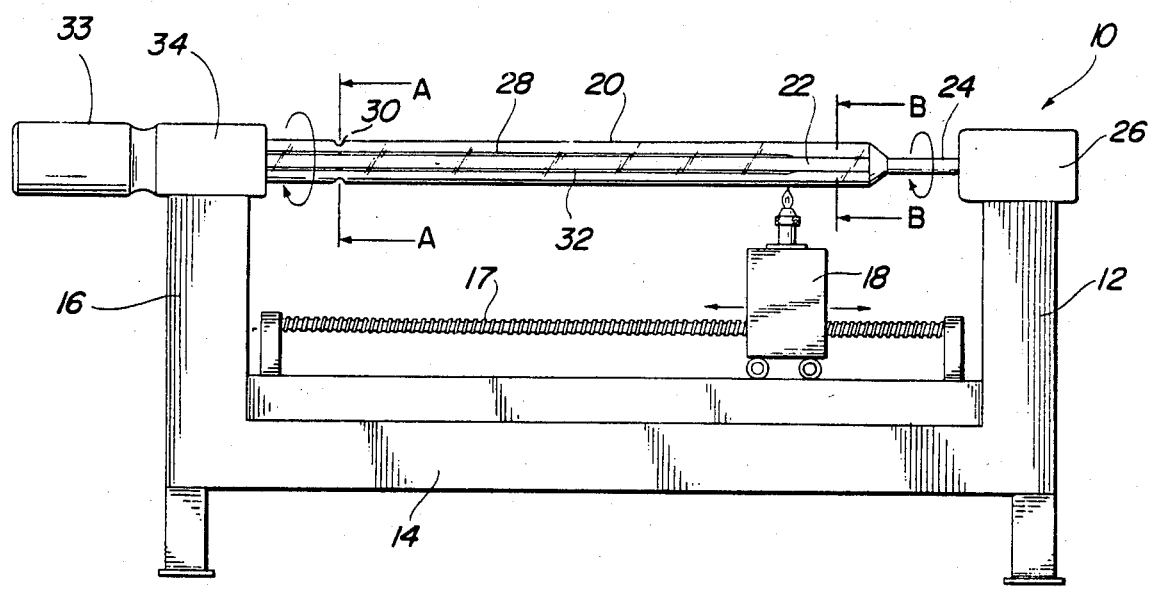
FIG. 1 is a schematic representation of a glass lathe which is used to form the present invention.

Referring to FIG. 1 there is shown a schematic representation of a glass lathe generally shown as 10. A standard glass lathe supporting structure associated with a glass lathe 10 is shown as 12, 14, and 16. A tailstock, shown as 26, is freely rotating and contains clamping means.

The headstock 34 also contains clamping means in addition to rotating means 35 which is either operated by an electrical or hydraulic motor. While FIG. 1 shows the glass lathe 10 in a horizontal position, the glass fiber preform may be produced with the glass lathe 10 in the vertical position. The vertical position may be used to minimize unwanted bowing of the softened working pieces.

The heat source 18 in the preferred embodiment is a oxyhydrogen burner although other sources of heat which will yield sustained temperatures ranging from 1,200° to 2,100°. Centigrade may be used. Although shown only in a schematic representation, the heat source 18 is designated to traverse the entire length of the work piece 20 at a velocity ranging from 1 to 18 centimeters per minute. The traversing means is normally a standard screw mounted fixture 17 which is associated with a glass lathe 10. The burner 18 is designated to traverse in either direction and return for another pass. The temperature as well as the traversing speed is controlled in order to produce the desired temperature on the surface of the work piece.

The work piece 20 which is a core rod is the foundation of the present invention. The core rod can be purchased with a specified index of refraction from several sources. In the preferred embodiment, the core rod is manufactered by a modified vapor axial deposition process (VAD) with an index of refraction varying between 1.460 and 1.462. One source for this modified VAD grown rod is NIPPON Telephone and Telegraph Corp. (NTT) whose VAD process is described in U.S. Pat. No. 4,062,665 to IZAWA et al and assigned to NTT.

In order to utilize the grown core rod 22, a glass handling rod is fused or welded to the end of the core rod 22 in a precise symetrical manner. The handling rod 24 is then placed in the tailstock 26 of the glass lathe 10 and chucked firmly in place.

A barrier tube 28, whose bore is slightly larger than the core 22 is slid over the core 22 until the end of the barrier tube 28 is aligned with the end of the core rod 22. The barrier tube 28 is the tube that is adjacent to the core rod 22 and is the nomenclature given to the tube adjacent to the core rod 22 by those skilled in the art of making fiber optic preforms. The gap between the inside of the barrier tube 28 and the outside of the core rod 22 can vary between 0.5 and 1.0 millimeters. The barrier tube 28 which is made from Vycor ® is further designated Glass Code 7913 and can be purchased from Corning Glass, Corning, N.Y. and is incorporated by reference. The composition of Vycor ® as designated by Corning Glass is approximately 96% silica, approximately 3.5% dopants and approximately ½% impurities. The index of refraction as designated by Corning Glass is 1.458. An example of dopants that may be present as stated by Corning Glass are boron, fluorine, or cesium. The impurities that may be present as stated by Corning Glass are usually oxides such as iron oxide or copper oxide. Vycor ® has been used for barrier tubes, however, it is not presently used due to fiber strength considerations. It has been found that the dopant material used in Vycor ® reacts with the contaminates in the atmosphere and causes the material to lose strength. However, in the present invention the Vycor ® will be buried within the preform and not subject to atmospheric contaminates, thereby not affecting the strength.

Figure 2:
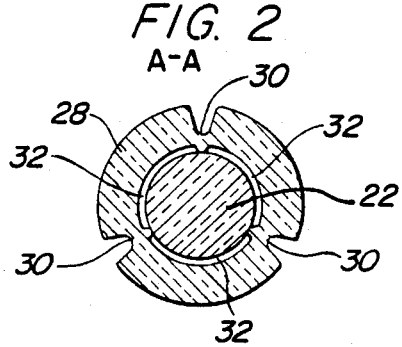
FIG. 2 is a section A—A of the core rod and the barrier tube showing the details of the tack welds and the gaps for the escaping gas.
Figure 3:
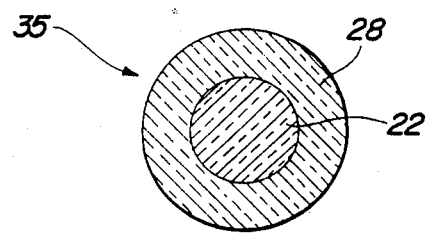
FIG. 3 is a section B—B of a first partial fiber optic preform.

In order to keep the barrier tube secured to the core rod 22, a tack weld 30 is made that welds the barrier tube 28 to the core rod 22. The details of the tack weld 30 can be seen in FIG. 2. There are at least three (3) weld places which leave a gap 32 to allow the heated gas to escape as the burner 18 traverses along the work piece 20. The combination of the barrier tube 28 and the core rod 22 is chucked into the glass lathe headstock 34 which is designed to rotate the combination by motor 33 to obtain circular distribution of the heat from burner 18. The glass lathe normally rotates a work piece at speeds of 85±20 revolutions per minute to produce heat uniformity. However, the speed of the burner 18 relative to barrier tube 28 and core rod 22 is to be adjusted by the operator to obtain a collapse of the barrier tube 28. The temperature as applied to the surface for a collapse of the barrier tube 28 onto the core rod 22 should vary between 1,800° and 2,000°. Centigrade. It should be recognized that more than one pass of the burner may be required to insure total collapse. In the preferred embodiment, the temperature of the barrier tube 28 core rod 22 combination is increased and the traverse speed is decreased on each subsequent pass to yield a decreasing diameter and, as the heat softens the barrier tube 28, the surface tension shrinks the barrier tube 28 onto the core rod 22. Total collapse is obtained when the smallest diameter is obtained or preferably a solid cylindrical mass is observed. The collapse of the barrier tube 28 onto the core rod 22 is shown in FIG. 3 and is defined as the first partial preform, generally shown as 35.

Figure 4:
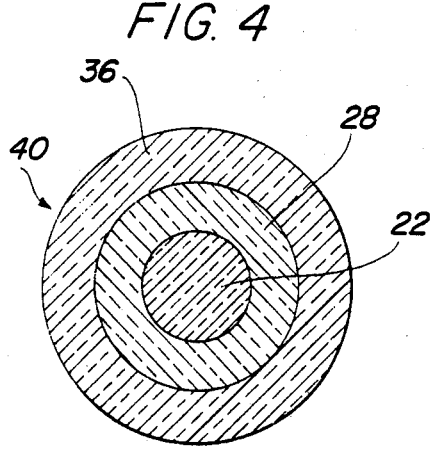
FIG. 4 is a representation of a section of a second partial fiber preform.

The preferred embodiment utilizes a primary jacket tube made of high purity quartz having an index of refraction of 1.459. This high purity quartz has inherent impurities of 1% or less and in this high purity form is commercially available. The high purity quartz core is slightly larger than the outside diameter of the first partial preform 35. The primary jacket 36 is shown collapsed around the first partial preform in FIG. 4. The steps of collapsing the primary jacket are identical to those of collapsing the barrier tube 28 onto the core rod 22. The primary jacket is slipped over the first partial preform 35 until the end of the primary jacket aligns with the end of the first partial preform 35. The primary jacket is than tack welded onto the first partial preform 35. This combination is then rotated and heated with the burner 18 traversing the entire length of the combination. Multiple passes may be required with the higher temperature and slower speed to insure total collapse. Once the primary jacket 36 is heated sufficiently, the surface tension will cause the primary jacket 36 to shrink onto the first partial preform 35. The combination of the primary jacket being totally collapsed onto the first partial preform yeilds a second partial preform generally shown as 40.

Figure 5:
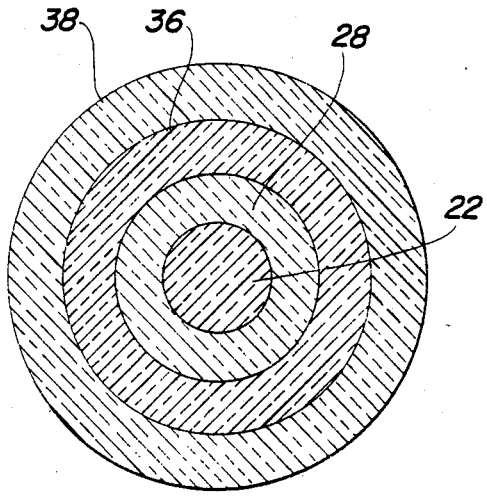
FIG. 5 is a representation of a section of a final fiber optic preform.

Also, in the preferred embodiment, if required, a second jacket shown as 38 in FIG. 5 of high purity quartz is used over the primary jacket 36 to obtain a final preform diameter. If the secondary jacket 38 is used, which has an index of refraction of 1.459, the steps of collapsing the secondary jacket 38 are identical to those described above. These steps include placing the secondary jacket 38 over the second partial preform 40, tack welding the secondary jacket 38 onto the second partial preform 40, rotating the combination, heating the combination and traversing the burner relative to the second partial preform 40 to obtain a collapse of the secondary jacket 38 onto the second partial preform 40. The secondary jacket 38 is shown collapsed onto the second partial preform in FIG. 5. Depending upon the desired diamter of the finished preform, the section shown in either FIG. 4 or FIG. 5 could represent the finished product which is an optical fiber preform for producing single mode fibers.

The optical fibers preform for producing single mode fibers must be started with a core rod 22 that has a minimum diameter of three (3) millimeters and a maximum diameter of 10 millimeters. The barrier tube diameter is defined as being equal to five (5) times the diameter of the core.

Numerous equations, formula and graphs are available to use in the design of single mode fibers and single mode fiber preforms are shown in chapters 5 and 7 of the book "An Introduction to Optical Fibers" by Allen H. Cherin, published by McGraw Hill Book Co., the disclosure of which is incorporated by reference.

The above discription outlines a method for fabricating a single mode optical fiber preform by rotating the work piece 20, varying the temperature of the burner 18, and traversing the burner 18 at varying speeds the length of the work piece 20. In the preferred embodiment, the work piece rotating speed, the burner temperature and the burner traversal speed would be programmed for a numerically controlled glass lathe to perform the required tasks of collapsing the barrier tube and jacket tubes to form a single mode fiber preform.

It will be readily apparent to those skiled in the art that various modifications and changes can be made without departing from the spirit of the invention.

What is claimed is:

1. A method of fabricating a single mode fiber preform comprising:
providing a solid cylindrical optical fiber core;
attaching a glass holding rod to one end of said solid cylindrical optical fiber core by fusing said holding rod to the end of said core;
sliding a barrier tube whose bore is slightly larger than said core over said core whereby said core and said barrier tube are positioned such that an annular gap is formed between the outer surface of said core and the inner surface of said barrier tube;
securing said barrier tube to said optical fiber core by a plurality of tack welds such that gas may pass through said annular gap formed between said barrier tube and said optical fiber core;
chucking said glass holding rod fused to one end of said core in the tailstock of a glass lathe;
chucking a combination of said core tack welded to said barrier tube in the headstock of said glass lathe;
rotating said combination of said barrier tube and said core by rotating said headstock of said glass lathe with rotating means;
traversing a moving heat source longitudinally relative to said rotating combination whereby said heat source heats said combination of said barrier tube and said core while tranversing;
continuing said traversing and thereby collapsing said barrier tube onto said optical fiber to form a first partial preform.

2. A method as described in claim 1 which said optical fiber core is produced using a modified vapor phase axial deposition process.

3. A method as described in claim 2 wherein said optical fiber core has an index of refraction between 1.460 and 1.463.

4. A method as described in claim 1 wherein said barrier tube is produced with an index of refraction of substantially 1.458.

5. A method as described in claim 1 wherein said heat source will produce heat in the range of 1,200° to 2,100° Centigrade.

6. A method as described in claim 1 wherein collapsing of said barrier tube to said optical fiber core is by traversing said heat source relative to said combination such that the surface tension will increase on the outside of the barrier tube and collapse the barrier tube onto the surface of the optical fiber core.

7. A method of fabricating a single mode fiber preform as described in claim 1 further comprising:
sliding a primary jacket tube whose bore is slightly larger than said first partial preform over said first partial preform whereby said first partial preform and said primary jacket tube are positioned such that an annular gap is formed between the outer surface of said first partial preform and the inner surface of said primary jacket tube;
securing said primary jacket tube to said first partial preform by a plurality of tack welds such that gas may pass through said annular gap formed between said primary jacket tube and said first partial preform;
chucking said glass holding rod fused to one end of said core in the tailstock of said glass lathe;
chucking a combination of said first partial preform tack welded to said primary jacket tube in the headstock of said glass lathe;
rotating the combination of said primary jacket tube and said first partial preform by rotating said headstock of said glass lathe with rotating means;
traversing said heat source relative to said rotating combination whereby said heat source heats said combination of said primary jacket tube and said first partial preform while traversing;

continuing said traversing and thereby collapsing said primary jacket tube onto said first partial preform to form a second partial peform.

8. A method as described in claim 7 wherein said primary jacket tube is made from high purity quartz.

9. A method as described in claim 8 wherein said high purity quartz primary jacket tube has an index of refraction of about 1.459.

10. A method as described in claim 7 wherein said heat source will produce a heat in the range of 1,200° to 2,100° Centigrade.

11. A method as described in claim 7 wherein collapsing of said primary jacket tube to said first partial preform is by traversing said heat source relative to said combination such that the surface tension will increase on the outside of the primary jacket tube and collapse the primary jacket tube onto the surface of the first partial preform.

12. A method of fabricating a single mode fiber preform as described in claim 9 further comprising:

sliding a secondary jacket tube whose bore is slightly larger than said second partial preform over said second partial preform whereby said second partial preform and said secondary jacket tube are positioned such that an annular gap is formed between the outer surface of said second partial preform and the inner surface of said secondary jacket tube;

securing said secondary jacket tube to said second partial preform by a plurality of tack welds such that gas may pass through said annular gap formed between said secondary jacket tube and said second partial preform;

chucking said glass holding rod fused to one end of said core in the tailstock of said glass lathe;

chucking a combination of said second partial preform tack welded to said secondary jacket tube in the headstock of said glass lathe;

rotating the combination of said secondary jacket tube and said second partial preform by rotating said headstock of said glass lathe with rotating means;

traversing said heat source relative to said rotating combination whereby said heat source heats said combination of said secondary jacket tube and said second partial preform while traversing;

continuing said traversing and thereby collapsing said secondary jacket tube onto said second partial preform to form a finished single mode optical fiber preform.

13. A method as described in claim 12 wherein said secondary jacket tube is made from high purity quartz.

14. A method as described in claim 13 wherein said high purity quartz secondary jacket tube has an index of refraction of about 1.459.

15. A method as described in claim 12 wherein said heat source will produce a heat in the range of 1,200° to 2,100° Centrigrade.

16. A method as described in claim 12 wherein collapsing of said second partial preform is by traversing said heat source relative to said combination surch that the surface tension will increase on the outside of the secondary jacket tube and collapse the secondary jacket tube onto the surface of the second partial preform.

* * * * *